(12) United States Patent
Muthu et al.

(10) Patent No.: US 10,148,954 B2
(45) Date of Patent: Dec. 4, 2018

(54) METHOD AND SYSTEM FOR DETERMINING INTRA MODE DECISION IN H.264 VIDEO CODING

(71) Applicant: RIVERSILICA TECHNOLOGIES PVT LTD, Bangalore (IN)

(72) Inventors: Essaki P Muthu, Indiranagar (IN); Jagadish K Kamath, Indiranagar (IN); Sudhir Kesti, Indiranagar (IN)

(73) Assignee: RIVERSILICA TECHNOLOGIES PVT LTD, Bangalore (IN)

( * ) Notice: Subject to any disclaimer, the term of this patent is extended or adjusted under 35 U.S.C. 154(b) by 87 days.

(21) Appl. No.: 14/908,425

(22) PCT Filed: Jul. 29, 2014

(86) PCT No.: PCT/IB2014/063494
§ 371 (c)(1),
(2) Date: Jan. 28, 2016

(87) PCT Pub. No.: WO2015/015404
PCT Pub. Date: Feb. 5, 2015

(65) Prior Publication Data
US 2016/0156905 A1 Jun. 2, 2016

(30) Foreign Application Priority Data
Jul. 29, 2013 (IN) ............................ 3381/CHE/2013

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/147* (2014.11); *H04N 19/176* (2014.11); *H04N 19/70* (2014.11); *H04N 19/96* (2014.11)

(58) Field of Classification Search
CPC ............. H04N 13/0438; H04N 13/026; H04N 13/0029
See application file for complete search history.

(56) References Cited

U.S. PATENT DOCUMENTS

2006/0165170 A1 7/2006 Kim et al.
2006/0182174 A1 8/2006 Kuo
(Continued)

OTHER PUBLICATIONS

MPEG-4 Part 10, Advanced Video Coding (MPEG-4 AVC), International Telecommunication Union, May 2013.

*Primary Examiner* — Anand S Rao
*Assistant Examiner* — Joseph W Becker
(74) *Attorney, Agent, or Firm* — Maschoff Brennan (57) ABSTRACT

The present disclosure provides a method and a system for determining a prediction mode for performing intra prediction of a plurality of frames of a digital video in H.264 video coding format. The method and system include a determination module to determine a 16×16 prediction mode from a first set of plurality of prediction modes for each of intra 16×16 macroblock utilizing a first pre-defined criteria and decide a 4×4 prediction mode from a second set of plurality of prediction modes for each of intra 4×4 sub-macroblock utilizing a second pre-defined criteria, a comparison module to compare computational cost of the 16×16 prediction mode and the 4×4 prediction mode and a declaration module to declare one of the 16×16 prediction mode and the 4×4 prediction mode as the prediction mode for each of the macroblock based on the compared computational cost.

6 Claims, 7 Drawing Sheets

(51) Int. Cl.
*H04N 19/147* (2014.01)
*H04N 19/96* (2014.01)
*H04N 19/70* (2014.01)

(56) References Cited

U.S. PATENT DOCUMENTS

2008/0117976 A1 5/2008 Lu et al.
2009/0116549 A1 5/2009 Shen et al.
2009/0274211 A1 11/2009 Zhou et al.
2010/0054331 A1 3/2010 Haddad et al.
2010/0290526 A1 11/2010 Tong et al.

| QP | $\lambda_1$ | $\lambda_2$ | | QP | $\lambda_1$ | $\lambda_2$ | | QP | $\lambda_1$ | $\lambda_2$ |
|---|---|---|---|---|---|---|---|---|---|---|
| 0 | 1 | 14 | | 18 | 2 | 921 | | 36 | 16 | 58982 |
| 1 | 1 | 18 | | 19 | 2 | 1161 | | 37 | 18 | 74313 |
| 2 | 1 | 22 | | 20 | 3 | 1462 | | 38 | 20 | 93628 |
| 3 | 1 | 28 | | 21 | 3 | 1843 | | 39 | 23 | 117964 |
| 4 | 1 | 36 | | 22 | 3 | 2322 | | 40 | 25 | 148626 |
| 5 | 1 | 45 | | 23 | 4 | 2925 | | 41 | 29 | 187257 |
| 6 | 1 | 57 | | 24 | 4 | 3686 | | 42 | 32 | 235929 |
| 7 | 1 | 72 | | 25 | 4 | 4644 | | 43 | 36 | 297252 |
| 8 | 1 | 91 | | 26 | 5 | 5851 | | 44 | 40 | 374514 |
| 9 | 1 | 115 | | 27 | 6 | 7372 | | 45 | 45 | 471859 |
| 10 | 1 | 145 | | 28 | 6 | 9289 | | 46 | 51 | 594505 |
| 11 | 1 | 182 | | 29 | 7 | 11703 | | 47 | 57 | 749029 |
| 12 | 1 | 230 | | 30 | 8 | 14745 | | 48 | 64 | 943718 |
| 13 | 1 | 290 | | 31 | 9 | 18578 | | 49 | 72 | 1189010 |
| 14 | 1 | 365 | | 32 | 10 | 23407 | | 50 | 81 | 1498059 |
| 15 | 1 | 460 | | 33 | 11 | 29491 | | 51 | 91 | 1887436 |
| 16 | 2 | 580 | | 34 | 13 | 37156 | | 52 | 102 | |
| 17 | 2 | 731 | | 35 | 14 | 46814 | | 53 | 114 | |

METHOD AND SYSTEM FOR DETERMINING INTRA MODE DECISION IN H.264 VIDEO CODING

TECHNICAL FIELD

The present disclosure relates to the field of video encoding and, in particular, relates to the field of intra prediction of frames in H.264 video coding format.

BACKGROUND

With the advancement in technology, a video is required to be rendered on different type of display devices. These display devices vary in sizes and capabilities. This often necessitates encoding of the videos in different formats so that they can be presented on the display devices with varying sizes and capabilities.

In a general sense, the encoding of a digital video is a process of compressing and/or decompressing it. The digital video may include spatial redundancies and temporal redundancies. The spatial redundancy corresponds to duplication of elements within the frame and the temporal redundancy corresponds to duplication of elements in two or more frames. The video encoding removes the spatial redundancies and the temporal redundancies, thereby reducing size and complexity of the digital video.

Video codec, a hardware device or a software application, performs encoding/decoding/transcoding of the digital video. In addition, the video codecs perform encoding/decoding/transcoding of the digital videos utilizing variety of video encoding formats including MPEG-2 Part 2, MPEG-4 Part 2, H.264 (MPEG-4 Part 10) and the like.

The H.264 standard, also referred to as Moving Picture Experts Group (MPEG)-4 Part 10 and Advanced Video Coding (AVC) is a video compression standard that provides a desirable video quality. However, the H.264 standard is resilient to poor network conditions and is more economic with usage of bandwidth. In addition, the H.264 standard enables video shape coding and broadens the range of environments for using the digital video. Initially, the H.264 standard splits stream of the digital video into single-image frames and then slice the single-image frames into 16×16 macroblocks. The 16×16 macroblocks may further be splitted in different sizes including 8×8 blocks, 4×4 blocks and the like. Further, to reduce the complexity of the digital video, the number of bits in the digital video is reduced by predicting redundancies in the macroblocks by utilizing various prediction modes.

Presently, various video codecs employ motion-compensated inter-frame prediction to exploit the temporal redundancy across the video frames to achieve high compression. Moreover, various video codecs (for example, H.264/AVC) employ spatial estimation for intra-frame prediction to reduce the spatial redundancy within an intra-coded frame.

Currently, the H.264 standard defines various prediction modes (hereinafter mode decision) for predicting the number of bits in the macroblocks. There are four coding modes that are defined for intra 16×16 block type and nine coding modes that are defined for intra 4×4 block type. The four coding modes for intra 16×16 block type include a DC prediction mode, a vertical prediction mode, a horizontal prediction mode and a plane prediction mode. Moreover, the nine coding modes for intra 4×4 block type include a vertical prediction mode, a horizontal prediction mode, a DC prediction mode, a diagonal down left prediction mode, a diagonal down right prediction mode, a vertical right prediction mode, a horizontal down prediction mode, a vertical left prediction mode and a horizontal up prediction mode. However, these coding modes require intensive computation in terms of processing hardware, power, storage and the like to encode each macroblock. This computational complexity poses challenge for encoding the digital videos in real-time. Thus, the video codecs exhaustively searches an optimal coding mode from the various prediction modes to achieve high compression efficiency of the digital video. Moreover, the current video codecs employ the exhaustive searching through multiple coding modes to determine the prediction mode with minimum computational complexity. However, due to the exhaustive searching, additional computational costs and complexity are incurred.

In light of the above stated discussion, there is a need for a method and system that overcomes the above stated drawbacks. In addition, the method and system should minimize the searching required for predicting the mode decisions. Further, the method and system should enable encoding/decoding/transcoding of the digital video without compromising on quality of the digital video. Furthermore, the method and system should provide reduction in computational complexity and hardware usage.

SUMMARY

In accordance with an aspect of the present disclosure, a method and a system for determining a prediction mode for performing intra prediction of a plurality of frames in a digital video is provided. The digital video is in H.264 video coding format. The method includes determining a 16×16 prediction mode from a first set of plurality of prediction modes for each of an intra 16×16 macroblock of each frame of the plurality of frames in the digital video, deciding a 4×4 prediction mode from a second set of plurality of prediction modes for each of an intra 4×4 sub-macroblock of the intra 16×16 macroblock of the each corresponding frame of the plurality of frames in the digital video, comparing computational cost of the first mode decision and the second mode decision and declaring one of said first mode decision and said second mode decision as a prediction mode for each of said macroblock based on compared computational cost. The 16×16 prediction mode is determined based on a calculated computational cost. The computational cost is calculated by utilizing first pre-defined criteria for each of the first set of plurality of prediction modes. The 16×16 prediction mode is a first mode decision. The 4×4 prediction mode is determined based on a calculated computational cost. The computational cost is calculated by utilizing second pre-defined criteria for each of the second set of plurality of prediction modes. The 4×4 prediction mode is a second mode decision.

In an embodiment of the present disclosure, the first set of plurality of prediction modes includes a DC prediction mode, a vertical prediction mode, a horizontal prediction mode and a plane prediction mode.

In another embodiment of the present disclosure, the second set of plurality of prediction modes includes a vertical prediction mode, a horizontal prediction mode, a DC prediction mode, a diagonal down left prediction mode, a diagonal downright prediction mode, and a vertical right prediction mode, a horizontal down prediction mode, a vertical left prediction mode and a horizontal up prediction mode.

In yet another embodiment of the present disclosure, the first pre-defined criteria includes selecting the plane prediction mode as a default mode for each intra-frame from the plurality of frames, calculating computational cost of the each 16×16 prediction mode for predicting the each intra 16×16 macroblocks and determining the first mode decision based on the compared computational cost.

In yet another embodiment of the present disclosure, the first pre-defined criteria includes selecting the plane prediction mode for each predicted-frame from the plurality of frames when the calculated computational cost of each of the vertical prediction mode, the horizontal prediction mode and the DC prediction mode is less than a pre-defined threshold.

In yet another embodiment of the present disclosure, the second predetermined criteria includes selecting a DC prediction mode for predicting the each intra 4×4 sub-macroblock when previous reconstructed sub-macroblocks are not present, considering one of the DC prediction mode, the horizontal prediction mode and the horizontal up prediction mode for predicting the intra 4×4 sub-macroblock when a left reconstructed sub-macroblock is present, choosing one of the DC prediction mode, the vertical prediction mode, the diagonal down left prediction mode and the vertical left prediction mode for predicting the intra 4×4 sub-macroblock when each of a top reconstructed sub-macroblock and a top right reconstructed sub-macroblock are present, selecting one of the 4×4 prediction modes from the second set of plurality of prediction modes for predicting the intra 4×4 sub-macroblock when each of a top reconstructed sub-macroblock, a left reconstructed sub-macroblock and a top-left reconstructed sub-macroblock are present and a top-right reconstructed sub-macroblock is not present and electing one of the 4×4 prediction modes from the second set of plurality of prediction modes for predicting the intra 4×4 sub-macroblock when each of a top reconstructed sub-macroblock, a left reconstructed sub-macroblock, a top-left reconstructed sub-macroblock, and a top-right reconstructed sub-macroblock are present. The reconstructed sub-macroblocks are encoded utilizing at least one of the first mode decision and the second mode decision.

In another aspect of the present disclosure, a system for determining the prediction mode for performing intra prediction of the plurality of frames in the digital video is provided. The digital video is in H.264 video coding format. The system includes a determination module, a comparison module and a declaration module. The determination module is configured to perform a set of steps. The set of steps includes determining the 16×16 prediction mode from the first set of plurality of prediction modes for each of the intra 16×16 macroblock of the each frame of the plurality of frames in the digital video and deciding the 4×4 prediction mode from the second set of plurality of prediction modes for each of the intra 4×4 sub-macroblock of the intra 16×16 macroblock of the each corresponding frame of the plurality of frames in the digital video. The 16×16 prediction mode is determined based on the calculated computational cost by utilizing the first pre-defined criteria for each of the first set of plurality of prediction modes. The 16×16 prediction mode is the first mode decision. The 4×4 prediction mode is determined based on the calculated computational cost by utilizing the second pre-defined criteria for each of the second set of plurality of prediction modes. The 4×4 prediction mode is the second mode decision. The comparison module is configured to compare computational cost of the first mode decision and the second mode decision. The declaration module is configured to declare one of the first mode decision and the second mode decision as the prediction mode for each of the macroblock based on the compared computational cost.

In an embodiment of the present disclosure, the first set of plurality of prediction modes includes the DC prediction mode, the vertical prediction mode, the horizontal prediction mode and the plane prediction mode.

In another embodiment of the present disclosure, the second set of plurality of prediction modes includes the vertical prediction mode, the horizontal prediction mode, the DC prediction mode, the diagonal down left prediction mode, the diagonal downright prediction mode, and the vertical right prediction mode, the horizontal down prediction mode, the vertical left prediction mode and the horizontal up prediction mode.

In yet another embodiment of the present disclosure, the first pre-defined criteria includes selecting the plane prediction mode as the default mode for each intra-frame from the plurality of frames, calculating computational cost of the each 16×16 prediction mode for predicting the each intra 16×16 macroblocks and determining the first mode decision based on the compared computational cost.

In yet another embodiment of the present disclosure, the first pre-defined criteria includes selecting the plane prediction mode for each predicted-frame from the plurality of frames when the calculated computational cost of each of the vertical prediction mode, the horizontal prediction mode and the DC prediction mode is less than the pre-defined threshold.

In yet another embodiment of the present disclosure, the second predetermined criteria includes selecting the DC prediction mode for predicting the each intra 4×4 sub-macroblock when previous reconstructed sub-macroblocks are not present, considering one of the DC prediction mode, the horizontal prediction mode and the horizontal up prediction mode for predicting the intra 4×4 sub-macroblock when a left reconstructed sub-macroblock is present, choosing one of the DC prediction mode, the vertical prediction mode, the diagonal down left prediction mode and the vertical left prediction mode for predicting the intra 4×4 sub-macroblock when each of the top reconstructed sub-macroblock and the top right reconstructed sub-macroblock are present, selecting one of the 4×4 prediction modes from the second set of plurality of prediction modes for predicting the intra 4×4 sub-macroblock when each of the top reconstructed sub-macroblock, the left reconstructed sub-macroblock and the top-left reconstructed sub-macroblock are present and the top-right reconstructed sub-macroblock is not present and electing one of the 4×4 prediction modes from the second set of plurality of prediction modes for predicting the intra 4×4 sub-macroblock when each of the top reconstructed sub-macroblock, the left reconstructed sub-macroblock, the top-left reconstructed sub-macroblock, and the top-right reconstructed sub-macroblock are present. The reconstructed sub-macroblocks are encoded utilizing at least one of the first mode decision and the second mode decision.

In yet another embodiment of the present disclosure, the system further includes an evaluation module for calculating computational cost of the each 16×16 prediction mode for predicting the intra 16×16 macroblock of the each frame of the plurality of frames in the digital video and the each 4×4 prediction mode for predicting the intra 4×4 sub-macroblock of the each intra 16×16 macroblock of the each corresponding frame of the plurality of frames in the digital video.

In yet another aspect of the present disclosure, a computer system for determining the prediction mode for performing intra prediction of the plurality of frames in the digital video is provided. The digital video is in H.264 video coding format. The computer system includes one or more processors and a non-transitory memory. The non-transitory memory includes instructions that, when executed by the one or more processors, causes the prediction module of the one or more processors to perform the set of steps. The set of steps includes determining, by the determination module, the 16×16 prediction mode from the first set of plurality of prediction modes for each of the intra 16×16 macroblock of the each frame of the plurality of frames in the digital video, deciding, by the determination module, the 4×4 prediction mode from the second set of plurality of prediction modes for each of the intra 4×4 sub-macroblock of the intra 16×16 macroblock of the each corresponding frame of the plurality of frames in the digital video. The 16×16 prediction mode is determined based on the calculated computational cost. The computational cost is calculated by utilizing the first pre-defined criteria for each of the first set of plurality of prediction modes. The 16×16 prediction mode is the first mode decision. The 4×4 prediction mode is determined based on the calculated computational cost. The computational cost is calculated by utilizing the second pre-defined criteria for each of the second set of plurality of prediction modes. The 4×4 prediction mode is the second mode decision, comparing, by the comparison module, computational cost of the first mode decision and the second mode decision and declaring, by the declaration module, one of the first mode decision and the second mode decision as the prediction mode for each of the macroblock based on the compared computational cost.

In an embodiment of the present disclosure, the first set of plurality of prediction modes includes the DC prediction mode, the vertical prediction mode, the horizontal prediction mode and the plane prediction mode.

In another embodiment of the present disclosure, the second set of plurality of prediction modes includes the vertical prediction mode, the horizontal prediction mode, the DC prediction mode, the diagonal down left prediction mode, the diagonal downright prediction mode, and the vertical right prediction mode, the horizontal down prediction mode, the vertical left prediction mode and the horizontal up prediction mode.

In yet another embodiment of the present disclosure, the first pre-defined criteria includes selecting the plane prediction mode as the default mode for each intra-frame from the plurality of frames, calculating computational cost of the each 16×16 prediction mode for predicting the each intra 16×16 macroblocks and determining the first mode decision based on the compared computational cost.

In yet another embodiment of the present disclosure, the first pre-defined criteria includes selecting the plane prediction mode for each predicted-frame from the plurality of frames when the calculated computational cost of each of the vertical prediction mode, the horizontal prediction mode and the DC prediction mode is less than the pre-defined threshold.

In yet another embodiment of the present disclosure, the second predetermined criteria includes selecting the DC prediction mode for predicting the each intra 4×4 sub-macroblock when previous reconstructed sub-macroblocks are not present, considering one of the DC prediction mode, the horizontal prediction mode and the horizontal up prediction mode for predicting the intra 4×4 sub-macroblock when a left reconstructed sub-macroblock is present, choosing one of the DC prediction mode, the vertical prediction mode, the diagonal down left prediction mode and the vertical left prediction mode for predicting the intra 4×4 sub-macroblock when each of the top reconstructed sub-macroblock and the top right reconstructed sub-macroblock are present, selecting one of the 4×4 prediction modes from the second set of plurality of prediction modes for predicting the intra 4×4 sub-macroblock when each of the top reconstructed sub-macroblock, the left reconstructed sub-macroblock and the top-left reconstructed sub-macroblock are present and the top-right reconstructed sub-macroblock is not present and electing one of the 4×4 prediction modes from the second set of plurality of prediction modes for predicting the intra 4×4 sub-macroblock when each of the top reconstructed sub-macroblock, the left reconstructed sub-macroblock, the top-left reconstructed sub-macroblock, and the top-right reconstructed sub-macroblock are present. The reconstructed sub-macroblocks are encoded utilizing at least one of the first mode decision and the second mode decision.

BRIEF DESCRIPTION OF THE FIGURES

Having thus described the invention in general terms, reference will now be made to the accompanying drawings, which are not necessarily drawn to scale, and wherein:

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Figure 1:
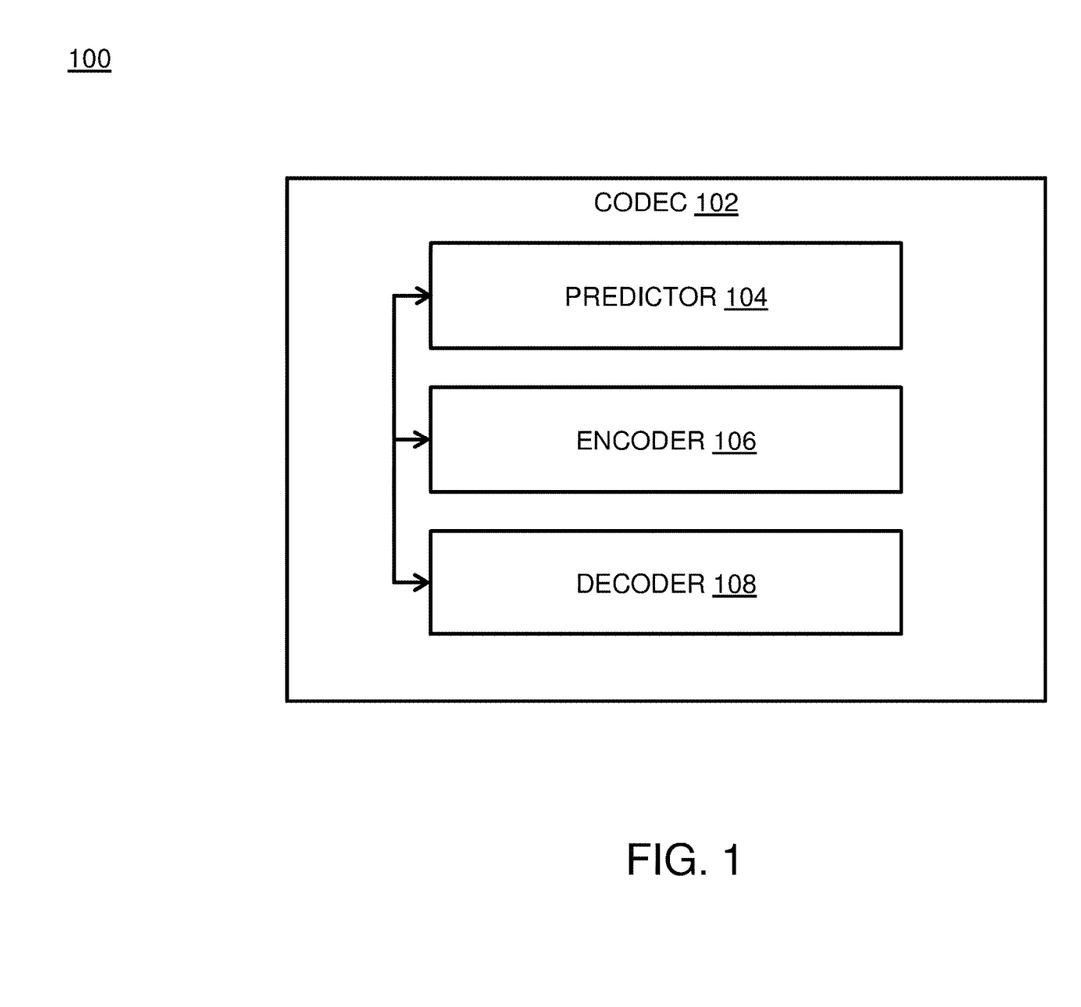
FIG. 1 illustrates a system for determining an intra mode decision in H.264 video coding, in accordance with various embodiments of the present disclosure.

FIG. 1 illustrates a system 100 for determining an intra mode decision in H.264 video coding, in accordance with various embodiments of the present disclosure. The system 100 includes a codec 102. The codec 102 can be a device, a hardware component or a software program. The codec 102 is capable of encoding and decoding a digital video. The codec 102 includes a predictor 104, an encoder 106 and a decoder 108. The predictor 104 determines intra mode decision for each of macroblocks and sub-macroblocks of each frame of the digital video. The number of bits required to represent an image frame can be reduced by performing the intra mode prediction on the pixel blocks. The intra mode prediction predicts block of pixels based on spatial correlation of the pixels with the neighboring pixels. The spatial correlation describes the correlation between frames of the digital video at different points in space. Accordingly, the encoder 106 encodes the macroblocks and sub-macroblocks of the frame and the decoder 108 decodes the encoded macroblocks and sub-macroblocks of the frame.

It may be noted that in FIG. 1, the codec 102 is capable of encoding and decoding the digital video; however, those skilled in the art would appreciate that the codec 102 makes the intra mode decision for predicting each intra 16×16 macroblock of the image frame from its reconstructed frame. For example, a block of pixels is predicted based on surrounding pixels using a prediction mode that results in the prediction that most closely resembles the actual pixels in that block.

Figure 2:
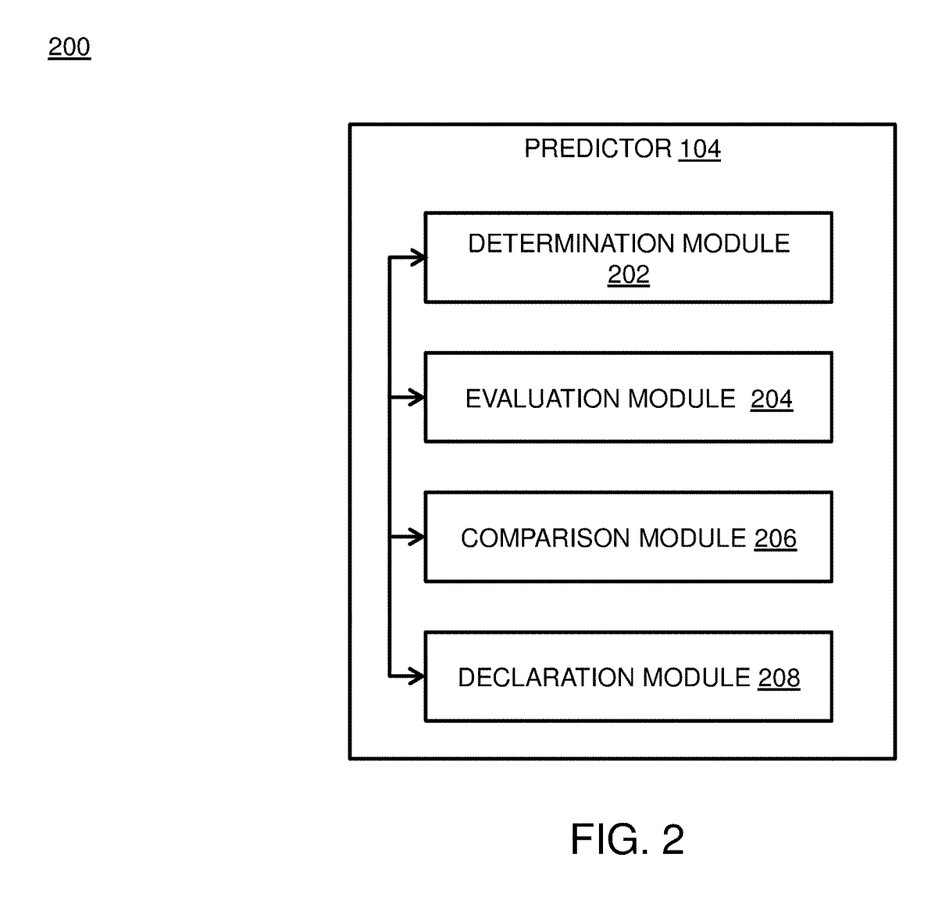
FIG. 2 illustrates a block diagram of a predictor, in accordance with various embodiments of the present disclosure.

FIG. 2 illustrates a block diagram 200 of the predictor 104, in accordance with various embodiments of the present disclosure. The predictor 104 includes a determination module 202, an evaluation module 204, a comparison module 206 and a declaration module 208. The determination module 202 determines a 16×16 prediction mode from a first set of plurality of prediction modes. The first set of plurality of prediction modes includes a DC prediction mode, a vertical prediction mode, a horizontal prediction mode and a plane prediction mode. The determination module 202 selects a prediction mode from the first set of plurality of prediction modes. The 16×16 prediction mode is determined based on a calculated computational cost by utilizing a first pre-defined criterion for each of the first set of plurality of prediction modes. The 16×16 prediction mode is a first mode decision. The first pre-defined criteria include determining the 16×16 prediction mode for an Intra frame (hereinafter I-frame) and a predicted frame (hereinafter P-frame).

The I-frame includes data required to display that frame and is independent of the frames that precede or succeed it. The P-frame requires information from a previous I-frame or P-frame, which may or may not be the frame directly preceding it. The determination module 202 selects the plane prediction mode as a default mode for the I-frame. The evaluation module 204 calculates cost for each of the prediction modes for predicting the intra 16×16 macroblock. In an embodiment of the present disclosure, a best prediction mode is decided based on the calculated computational cost. The best prediction mode is the mode with minimum cost.

Figure 4:
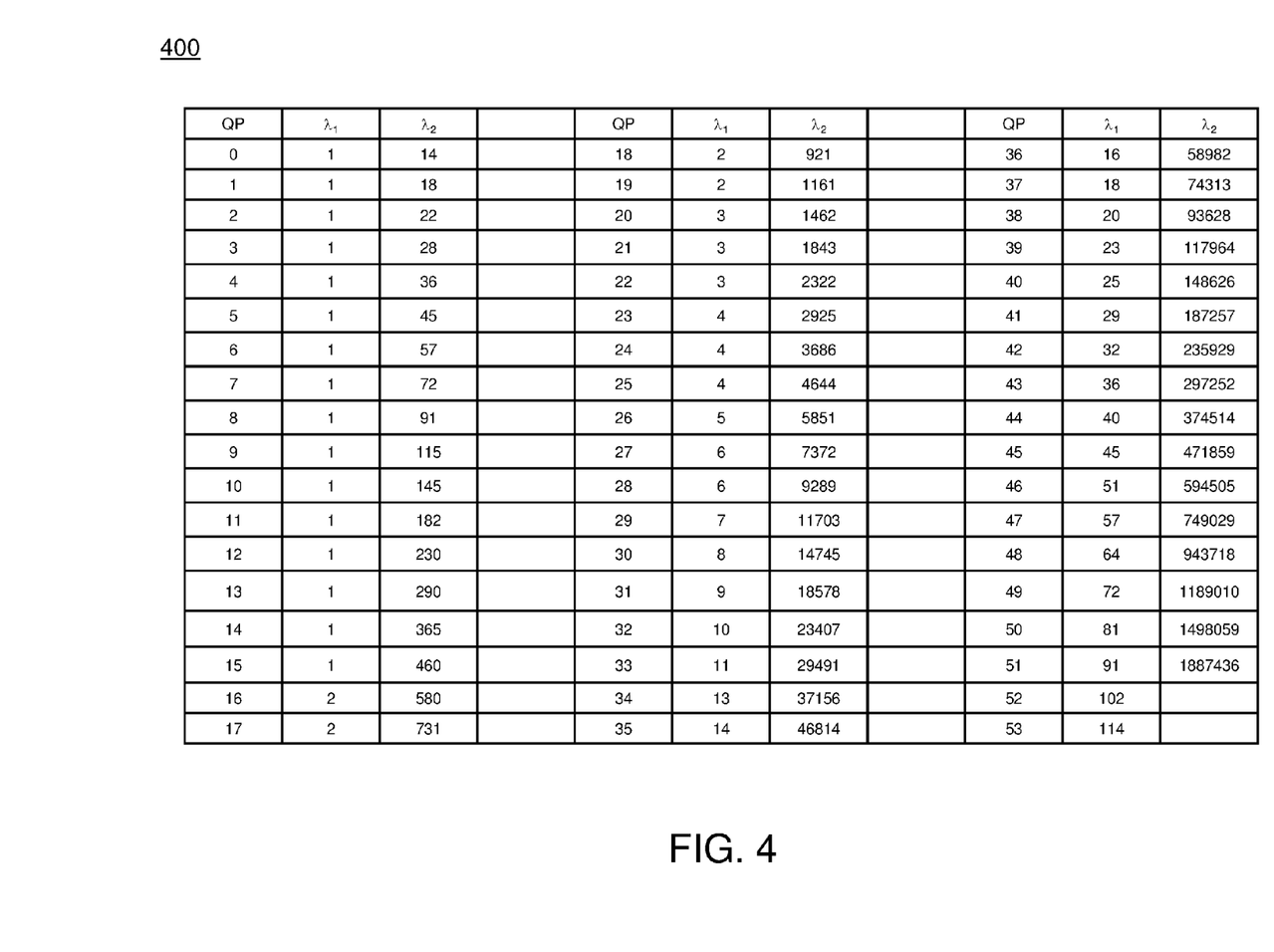
FIG. 4 is a table illustrating multiple Lagrangian multipliers with respect to quadratic programming (QP), in accordance with various embodiments of the present disclosure.

In an embodiment of the present disclosure, the cost of each prediction mode in the first mode decision is calculated as:

$$cost_i = SATD(org - pred_i) + \lambda_1 \times modebits_i$$

where, "i" is one of the prediction modes that varies from 0 to 3 (0-Vertical, 1-Horizontal, 2-DC, and 3-Plane), SATD is Sum of Absolute of Transformed Difference (Hadamard Transform), "org" is original 16×16 pixel values of each mode i, λ1 is lagrangian multiplier which varies with respect to quadratic programming (QP), as illustrated in FIG. 4, and mode bits refers to bits that represent difference between the prediction mode and a most probable mode.

$$modebits_i = \begin{cases} 1, & \text{Vertical Mode} \\ 3, & \text{Horizontal and } DC \text{ Mode} \\ 5, & \text{Plane Mode} \end{cases}$$

The H.264 standard defines the Hadamard transform (HDT) as a transform with transform coefficients of 1 and −1. The Hadamard transform is a class of Fourier transforms. An advantage of having coefficients of 1 or −1 is that the HDT can be performed without using multiplication and division. Further, maximum number of bits required to represent a transformed result is not more than 12 bits.

In an embodiment of the present disclosure, the evaluation module 204 merges 2 consecutive transformed values to 32 bits. For example, Txval1+Txval2<<16, the second value is shifted by 16 bits and stored as a most significant bit (MSB). The Txval1 is a first transformed value. The Txval2 is a second transformed value. The 16 bits have sign extension of Txval1. Thus, addition operations and subtraction operations are reduced by half as one addition/subtraction operation adds/subtract 2 values of 16 bit in parallel. The values can be separated later once the transform operation is completed.

In an embodiment of the present disclosure, for P-frame, the determination module 202 selectively considers the plane prediction mode for determining the prediction of the intra 16×16 macroblock. In this embodiment, the determination module 202 implements the plane prediction mode only when any of the calculated computational cost for the vertical, the horizontal and the DC prediction modes is less than a pre-defined threshold. The pre-defined threshold includes pre-defined values in a look-up table.

In an embodiment of the present disclosure, the method disclosed herein thereby eliminates a need to estimate cost of the plane prediction mode in all situations, thereby decreasing number of computations. The pre-defined threshold is calculated as follows:

$$threshold = (5 \times intercost) \gg 2 + 1$$

$$intercost = \begin{cases} \text{cost from Motion Estimation,} & P\text{-frame} \\ \text{high value,} & I\text{-frame} \end{cases}$$

Further, the determination module 202 decides a 4×4 prediction mode from a second set of plurality of prediction modes for each of an intra 4×4 sub-macroblock of the intra 16×16 macroblock of each of the corresponding frame of the plurality of frames in the digital video. The second set of the plurality of prediction modes includes a vertical prediction mode, a horizontal prediction mode, a DC prediction mode, a diagonal down left prediction mode, a diagonal downright prediction mode, and a vertical right prediction mode, a horizontal down prediction mode, a vertical left prediction mode and a horizontal up prediction mode.

In an embodiment of the present disclosure, the 4×4 prediction mode is determined based on another calculated computational cost by utilizing second pre-defined criteria for each of the second set of the plurality of prediction modes. The 4×4 prediction mode is a second mode decision.

In an embodiment of the present disclosure, the second pre-defined criteria include one or more cases. In the first case, when there are no previous reconstructed sub-macroblocks available and current sub-macroblock is first sub-macroblock to be predicted, then the evaluation module 204 implements the DC prediction mode for predicting the intra 4×4 sub-macroblock. In the second case, when a left reconstructed sub-macroblock is available, the evaluation module 204 may implement the DC prediction mode, the horizontal prediction mode or the horizontal up prediction mode to predict the intra 4×4 sub-macroblock. In the third case, when a top and a top right reconstructed sub-macroblocks are available, the evaluation module 204 may implement the DC prediction mode, the vertical prediction mode, the diagonal down left prediction mode or the vertical left prediction mode to predict the intra 4×4 sub-macroblock. In the fourth case, when the top, the left and a top-left reconstructed sub-macroblocks are available and no top-right reconstructed sub-macroblock is available, the evaluation module 204 may select a prediction mode from the second set of the plurality of prediction modes for predicting the intra 4×4 sub-macroblock. In fifth case, when the top, the left, the top-left, and the top-right reconstructed sub-macroblocks are available the evaluation module 204 may select a prediction mode from the second set of the plurality of prediction modes for predicting the intra 4×4 sub-macroblock.

It may be noted that in first, second and third cases, the corresponding prediction modes are used for predicting the intra 4×4 sub-macroblocks. Further, in fourth and fifth cases, the determination module 202 determines the best prediction mode for predicting the intra 4×4 sub-macroblocks, as disclosed in the detailed description of FIG. 5. The evaluation module 204 calculates cost for each of the prediction modes for predicting the intra 4×4 sub-macroblock. A best prediction mode is decided based on the calculated computational cost. The best prediction mode is the mode with minimum cost.

In an embodiment of the present disclosure, the cost of each prediction mode in the second mode decision is calculated as follows:

$$cost_i = SATD(org-pred4\times4) + \lambda_1 \times mode\ difference\ bits_i$$

where, "i" refers to possible prediction modes, SATD refers to the Sum of Absolute of Hadamard Transformed Difference, "org" refers to original 4×4 pixel values, "pred4×4" refers to predicted 4×4 pixel values. $\lambda_1$ refers to lagrangian multiplier which varies with respect to quadratic programming (QP), as illustrated in FIG. 4, and the mode difference bits refers to bits that represent the difference between the prediction mode and the most probable mode. The most probable mode (mpm), as per the H.264 standard is defined as:

$$mode\ difference\ bits = \begin{cases} 0, & mode = mpm \\ 3, & else \end{cases}$$

$$mpm = \begin{cases} min(left\ mode, top\ mode) & if\ available \\ dc\ mode & else \end{cases}$$

In an embodiment of the present disclosure, the mode decision minimizes the difference between the values of the macroblock and predicted values and number of bits used to represent residue and syntax elements. The residue is the difference between the actual values and the predicted values of the macroblock.

In an embodiment of the present disclosure, the codec 102 calculates the bits for the syntax elements. For example, the syntax elements include macroblock type, coded block pattern, modes and the like using the lookup table or pre-defined values. The prediction mode that results in minimum residue is selected.

In another embodiment of the present disclosure, the codec 102 calculates an RDcost for determining the cost of each of the prediction mode. The RDcost is as follows: RDCost involves reconstructed data as follows:

$$RDCost = SSE(org-recon) + \lambda_2 \times bits\ (residue\ and\ syntax\ elements)$$

Where, "recon" refers to reconstructed chroma data.

In another embodiment of the present disclosure, if more than one prediction mode yields the minimum cost, then the evaluation module 204 selects the best prediction mode based on index of the prediction mode. The index varies from 0 to 8 representing the vertical prediction mode to the horizontal up prediction mode. Among all the prediction modes which have equal and minimum cost, the most probable mode is given highest priority. The most probable mode is selected as the best prediction mode, when the most probable mode is present among the prediction modes.

In yet another embodiment of the present disclosure, the calculated computational costs of the sixteen intra 4×4 sub-macroblocks in the intra 16×16 macroblocks are summed to get the cost of the second mode decision. The evaluation module 204 then adds macroblock type cost and coded block pattern cost with the cost of the second mode decision. The evaluation module 204 calculates the coded block pattern cost as follows:

$$coded\ block\ pattern\ cost = \lambda_1 \times (coded\ block\ pattern\ bits + 32)$$

In yet another embodiment of the present disclosure, the coded block pattern cost is a six bits pattern. The bits are filled based on availability of quantized residue coefficients in each 8×8 sub-macroblock of luma and chroma for a macroblock. The coded block pattern for luma is calculated as described in H.264 Standard. The coded block pattern for chroma is assumed to be 2. The number of bits of coded block pattern is calculated as given in the H.264 Standard. The macroblock type cost is calculated as follows:

$$macroblock\ type\ cost = \lambda_1 \times macroblock\ type\ bits$$

$$macroblock\ type\ bits = \begin{cases} 36, & I\text{-frame} \\ 41, & P\text{-frame} \end{cases}$$

In an embodiment of the present disclosure, the comparison module 206 compares the calculated computational cost of the first mode decision and the second mode decision. The evaluation module 204 selects the best prediction mode for predicting the macroblock. The method disclosed herein evaluates only some of the prediction modes for selecting the best prediction mode and thereby reduces computational complexity of the intra mode decision.

In yet another embodiment of the present disclosure, the evaluation module 204 follows the same method as that of the first mode decision for performing an intra chroma mode decision.

In an embodiment of the present disclosure, the declaration module 208 declares one of the first mode decision and the second mode decision as a prediction mode for each of the macroblock based on the compared computational cost.

In yet another embodiment of the present disclosure, the codec 102 enables two modes of operation. The modes of operation include a selective path mode and a full path mode. The selective path mode selects the prediction mode without evaluating all the available prediction modes for predicting a block. The codec 102 disclosed herein thereby offers a user flexibility to switch between the selective path mode and the full path mode. In the full path mode, all the prediction modes are enabled for predicting the block. For example, for each block, the codec 102 evaluates each prediction mode and calculates the cost of the prediction mode. Accordingly, the codec 102 selects the prediction mode with the minimum cost for performing the prediction. The selection of the selective path is based on one or more conditions. In the first condition, the calculated cost from the first mode decision is less than the pre-defined threshold. In the second condition, any of the neighborhood macroblocks is the intra 16×16 macroblock, when the image frame is the P-frame. In the third condition, the present intra 16×16 macroblock is a first row or a first column macroblock and the cost of the intra 16×16 macroblock is less than double of the pre-defined threshold.

Figure 3:
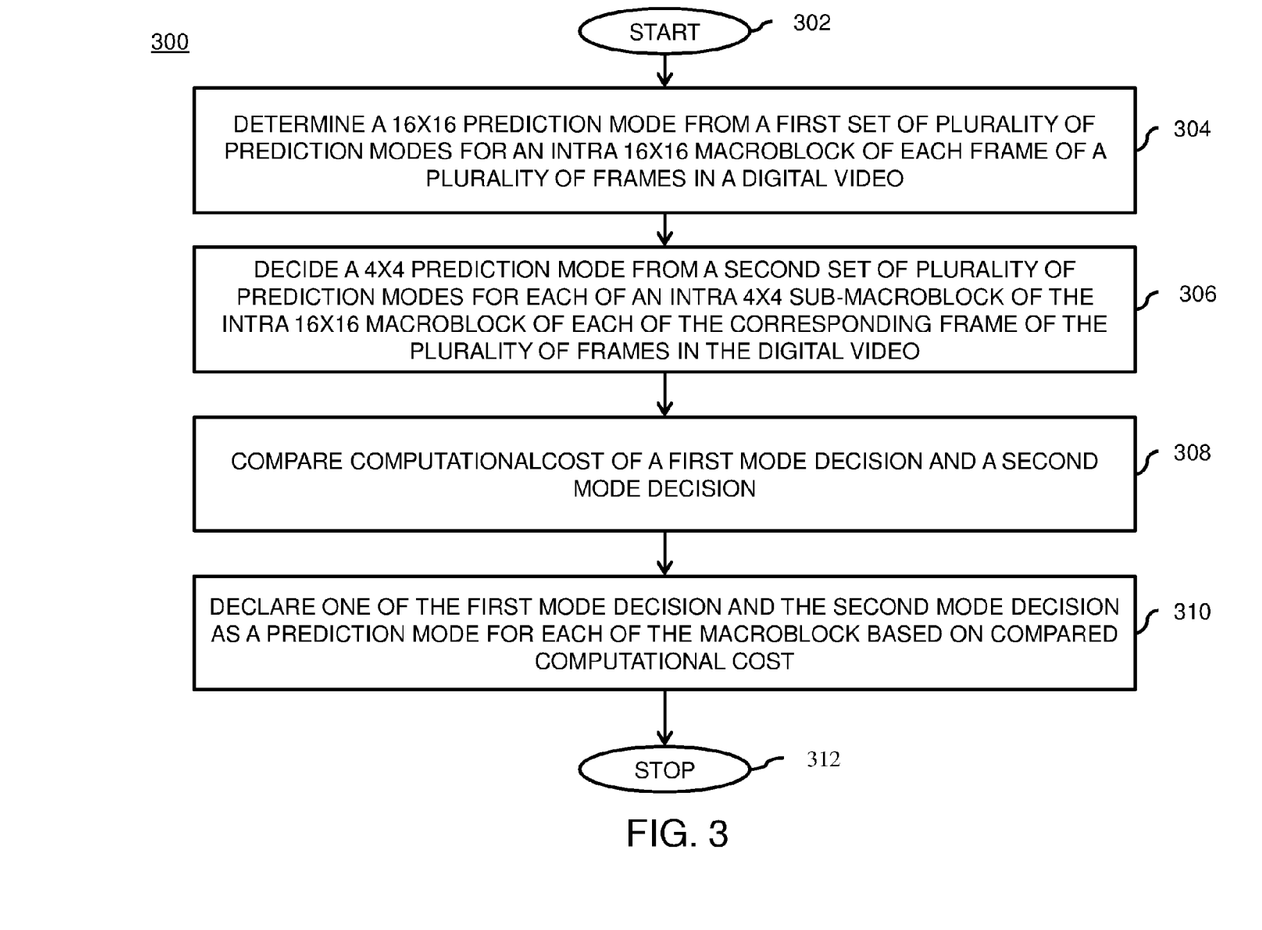
FIG. 3 is a flowchart for determining the intra mode decision in the H.264 video coding, in accordance with various embodiments of the present disclosure.

FIG. 3 is a flowchart 300 for determining the intra mode decision in the H.264 video coding, in accordance with various embodiments of the present disclosure. The flowchart 300 initiates at step 302. Following the step 302, at step 304, the determination module 202 determines the first mode decision from the first set of plurality of prediction modes for each of the intra 16×16 macroblock of each of the frame of the plurality of frames in the digital video. The first mode decision is determined based on the calculated computational cost. The computational cost is calculated by utilizing the first pre-defined criteria for each of the first set of the plurality of prediction modes. The first pre-defined criterion is described in the detailed description of FIG. 2. At step 306, the evaluation module 204 decides the second mode decision from the second set of the plurality of prediction modes for each of the intra 4×4 sub-macroblock of the intra 16×16 macroblock of each of the corresponding frame of the plurality of frames in the digital video. The second mode decision is determined based on the calculated computational cost. The computational cost is calculated by utilizing the second pre-defined criterion for each of the second set of the plurality of prediction modes. The second pre-defined criterion is described in the detailed description of FIG. 2. At step 308, the comparison module 206 compares computational cost of the first mode decision and the second mode decision. At step 310, the declaration module 208 declares one of the first mode decision and the second mode decision as the prediction mode for each of the macroblock based on the compared computational cost. The flowchart 300 terminates at step 312.

FIG. 4 is a table 400 illustrating the multiple Lagrangian multipliers with respect to quadratic programming (QP), in accordance with various embodiments of the present disclosure. The lagrangian multiplier varies with respect to quadratic programming (QP).

Figure 5A:
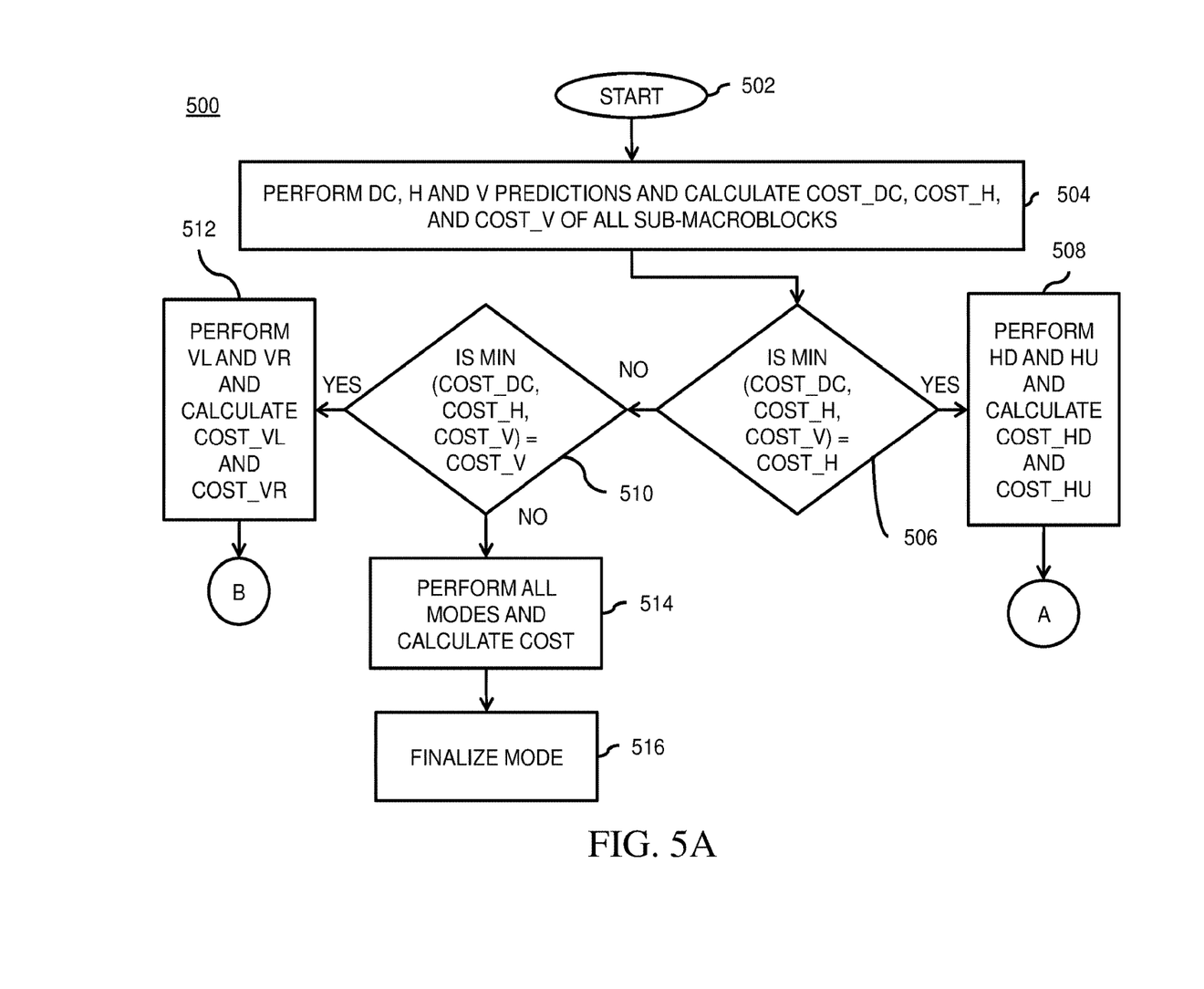
FIGS. 5A-5C are a flowchart for determining a best prediction mode for an intra 4×4 sub-macroblock, in accordance with various embodiments of the present disclosure.
Figure 5B:
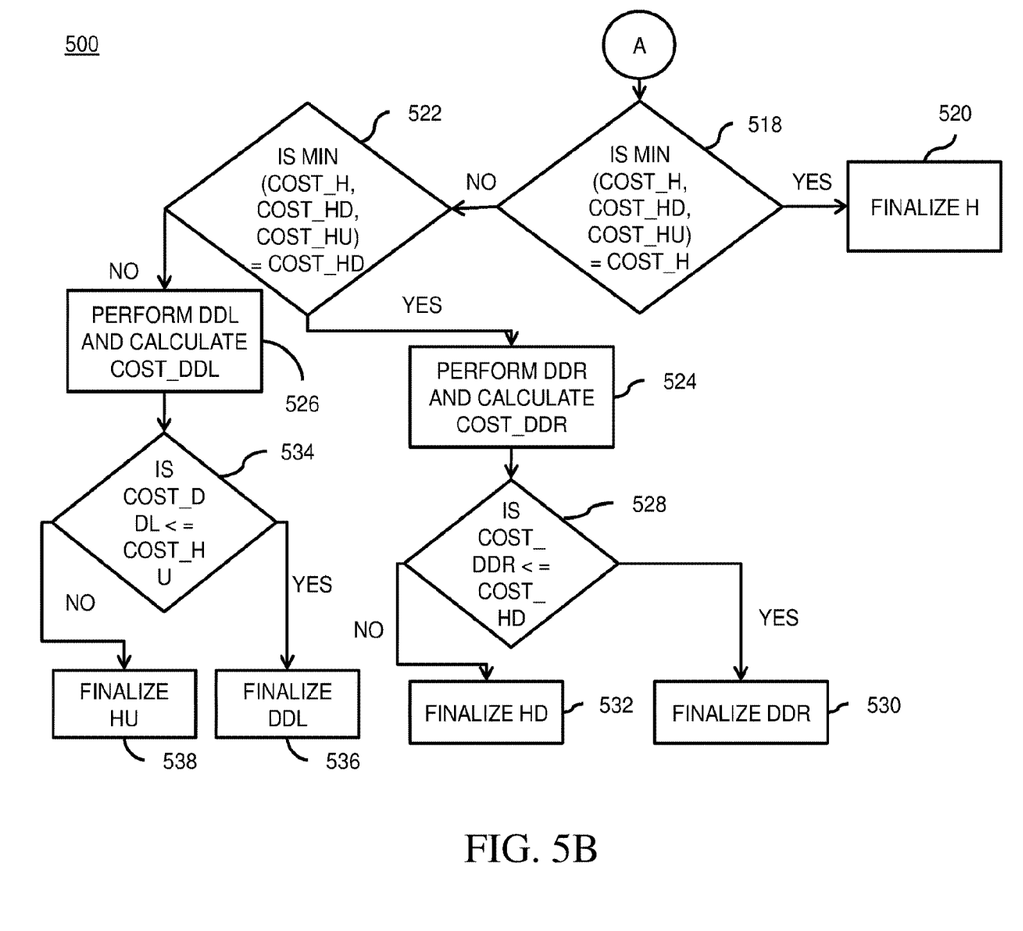
Figure 5C:
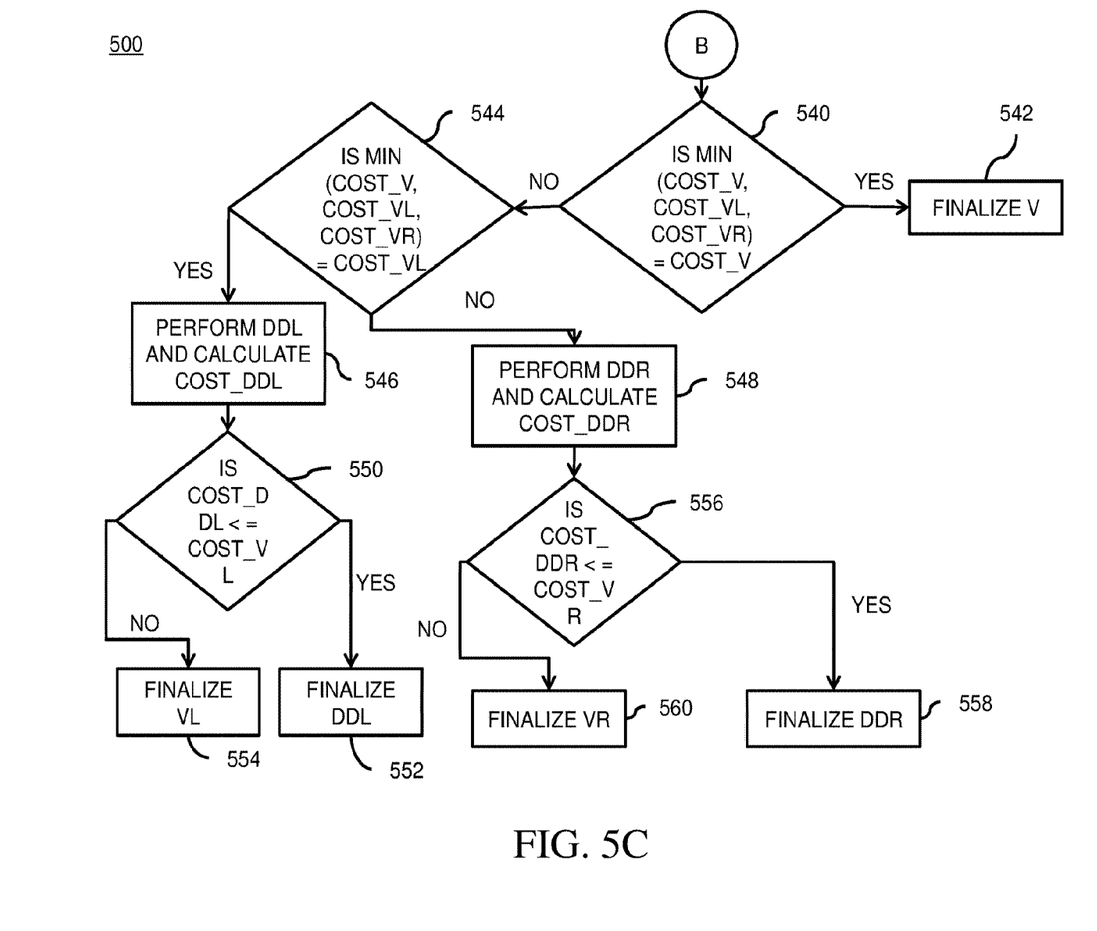

FIGS. 5A-5C are a flowchart 500 illustrates steps for determining the best prediction mode for the intra 4×4 sub-macroblock). The flow chart 500 initiates at step 502. Following the step 502, at step 504, the determination module 202 performs the DC prediction, the horizontal prediction and the vertical prediction for the intra 4×4 sub-macroblocks. The evaluation module 204 calculates cost of the DC prediction (cost_DC), cost of the horizontal prediction (cost_H) and cost of the vertical prediction (cost_V). At step 506, the comparison module 206 checks whether the minimum cost among the costs of cost_DC, cost_H, and cost_V is the cost_H. If the minimum cost among the costs of cost_DC, cost_H, and cost_V is the cost_H, then at step 508 the determination module 202 performs the horizontal up prediction and the horizontal down prediction. The evaluation module 204 calculates cost of the horizontal up prediction (cost_HU) and cost of the horizontal down prediction (cost_HD). At step 518, the comparison module 206 checks whether the minimum cost among the costs of cost_H, cost_HD, and cost_HU is the cost_H. If the minimum cost among the costs of cost_H, cost_HD, and cost_HU is the cost_H, then at step 520, the declaration module 208 declares the horizontal prediction mode as a best prediction mode.

If the minimum cost among the costs of cost_H, cost_HD, and cost_HU is not the cost_H, then at step 522, the comparison module 206 checks whether the minimum cost among the costs of cost_H, cost_HD, and cost_HU is the cost_HD. If the minimum cost among the costs of cost_H, cost_HD, and cost_HU is the cost_HD, then at step 524, the determination module 202 performs the diagonal down-right prediction. The evaluation module 204 calculates cost of the diagonal down-right prediction (cost_DDR). At step 528, the comparison module 206 checks whether the cost_DDR is lesser than or equal to the cost_HD. If the cost_DDR is lesser than or equal to the cost_HD, then at step 530, the declaration module 208 declares the diagonal down-right prediction mode as the best prediction mode. If the cost_HD is lesser than the cost_DDR, then at step 532, the declaration module 208 declares the horizontal down prediction mode as the best prediction mode.

If the minimum cost among the costs of cost_H, cost_HD, and cost_HU is not the cost_HD, then at step 526, the determination module 202 performs the diagonal down left prediction. The evaluation module 204 calculates cost of the diagonal down left prediction mode (cost_DDL). At step 534, the comparison module 206 checks whether the cost_DDL is lesser than or equal to the cost_HU. If the cost_DDL is lesser than or equal to the cost_HU, then at step 536, the declaration module 208 declares the diagonal down left prediction mode as the best prediction mode. If cost_HU is lesser than cost_DDL, then at step 538, the declaration module 208 declares the horizontal up prediction mode as the best prediction mode.

If the minimum cost among the costs of cost_DC, cost_H, and cost_V is not the cost_H, then at step 510, the comparison module 206 checks whether the minimum cost among the costs of cost_DC, cost_H, and cost_V is the cost_V. If the minimum cost among the costs of cost_DC, cost_H, and cost_V is the cost_V, then at step 512, the determination module 202 performs the vertical left prediction and vertical right prediction. The evaluation module 204 calculates cost of the vertical left prediction (cost_VL) and cost of the vertical right prediction (cost_VR). At step 540, the comparison module 206 then checks whether the minimum cost among the costs of cost_V, cost_VL, and cost_VR is the cost_V. If the minimum cost among the costs of cost_V, cost_VL, and cost_VR is the cost_V, then at step 542, the declaration module 208 declares the vertical prediction mode as the best prediction mode.

If the minimum cost among the costs of cost_V, cost_VL, and cost_VR is not the cost_V, then at step 544, the comparison module 206 checks whether the minimum cost among the costs of cost_V, cost_VL, and cost_VR is the cost_VL. If the minimum cost among the costs of cost_V, cost_VL, and cost_VR is the cost_VL, then at step 546, the determination module 202 performs the diagonal down left prediction. The evaluation module 204 calculates cost of the diagonal down left prediction (cost_DDL). At step 550, the comparison module 206 then checks whether the cost_DDL is lesser than or equal to the cost_VL. If the cost_DDL is lesser than or equal to the cost_VL, then at step 552, the declaration module 208 declares the diagonal down left prediction mode as the best prediction mode. If the cost_VL is lesser than the cost_DDL, then at step 554, the declaration module 208 declares the vertical left prediction mode as the best prediction mode.

If the minimum cost among the costs of cost_V, cost_VL, and cost_VR is not the cost_VL, then at step 548, the determination module 202 performs a diagonal down-right prediction. The evaluation module 204 calculates cost of the diagonal down-right prediction mode (cost_DDR). At step 556, the comparison module 206 then checks whether the cost_DDR is lesser than or equal to the cost_VR. If the cost_DDR is lesser than or equal to the cost_VR, then at step 558, the declaration module 208 declares the diagonal down-right prediction mode as the best prediction mode. If the cost_VR is lesser than the cost_DDR, then at step 560, the declaration module 208 declares the vertical right prediction mode as the best prediction mode.

If the minimum cost among the costs of cost_DC, cost_H, and cost_V is not the cost_V, then at step 514, the determination module 202 performs the prediction in each of the second set of plurality of prediction modes. The evaluation module 204 calculates respective costs. At step 516, the declaration module 208 declares the best prediction mode based on the calculated cost. The best prediction mode is the prediction mode of the intra 16×16 macroblock. The declaration module 208 declares the prediction mode that has the minimum cost.

In an embodiment of the present disclosure, the number of prediction modes selected by the codec 102 for the second mode decision is therefore less than standard approaches. Furthermore, the best prediction mode is obtained quickly and computational complexity is considerably reduced.

In yet another aspect of the present disclosure, a computer system determines the prediction mode for performing intra prediction of the plurality of frames in the digital video. The digital video is in H.264 video coding format. The computer system includes one or more processors and a non-transitory memory. The non-transitory memory includes instructions that, when executed by the one or more processors, causes the prediction module of the one or more processors to perform the set of steps explained in conjunction with FIG. 3, FIG. 4 and FIGS. 5A-5A.

The present disclosure provides a method and system that overcomes the drawbacks of the prior art. In addition, the method and system minimizes the searching required for predicting the mode decisions. Further, the method and system enables encoding/decoding/transcoding of the digital video without compromising on quality of the digital video. Furthermore, the method and system reduces the computational complexity and hardware usage.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A method for determining a prediction mode for performing intra prediction of a 16×16 macro-block, the method comprising:
    determining a cost associated with each of a DC prediction mode, a V-prediction mode, an H-prediction mode and a plane prediction mode for predicting the 16×16 macro-block and choosing a mode having the lowest cost as a first mode;
    determining costs associated with one or more modes for each 4×4 sub-macroblocks of the 16×16 macro-block and choosing a mode having the lowest cost as a second mode for each 4×4 sub-macroblocks;
    computing a cumulative of the lowest costs and comparing the cumulative of the lowest costs with the cost associated with the first mode;
    choosing the mode with the lower cost among the cumulative cost and the cost associated with the first mode for performing intra prediction of the 16×16 macro-block,
    wherein, determining the second mode for each of the 4×4 sub-macroblocks of the 16×16 macro-block comprises:
        calculating a cost associated with DC prediction mode, H-prediction mode, and V-prediction mode;
        in response to a cost associated with the DC prediction mode is less than the cost associated with the H-prediction mode and the cost associated with the V-prediction mode, calculating a cost associated with each directional mode and associated diagonal directional modes for both H-prediction mode and the V-prediction modes and choosing the mode with minimum cost associated with it as the second mode; instead of selecting the mode with a lower cost between H-prediction mode and V-prediction mode;
        calculating a cost associated with each directional mode associated with the selected mode;
        in response to the cost associated with the selected mode being less than the cost associated with the directional modes associated with the selected mode, selecting the selected mode as the second mode instead of calculating cost associated with each diagonal directional mode, and comparing the calculated cost with the cost associated with the directional modes; and
        selecting the mode with least cost, as the second mode.

2. The method as claimed in claim 1, wherein the directional modes associated with the H-prediction mode comprise a horizontal up prediction mode and a horizontal down prediction mode.

3. The method as claimed in claim 1, wherein the directional modes associated with the V-prediction mode comprise a vertical right prediction mode and a vertical left prediction mode.

4. The method as claimed in claim 1, wherein the diagonal directional modes comprise a diagonal down right prediction mode and a diagonal down left prediction mode.

5. The method as claimed in claim 1, wherein, the cost associated with the selected intra-frame coding mode for the 16×16 macro-block is compared with a cost associated with an inter-frame coding mode for transcoding the 16×16 macro-block, and one of the intra-frame coding mode and the inter-frame coding mode is selected based on the minimum cost.

6. A System for determining a prediction mode for performing intra prediction of a 16×16 macro-block, the system comprising:
    one or more processors; and
    a non-transitory memory containing instructions that, when executed by said one or more processors, causes a prediction module of said one or more processors to perform operations comprising:
        determining a cost associated with each of a DC prediction mode, a V-prediction mode, a H-prediction mode and a plane prediction mode for predicting the 16×16 macro-block and choosing a mode having the lowest cost as a first mode;
        determining costs associated with one or more modes for each 4×4 sub-macroblocks of the 16×16 macro-block and choosing a mode having the lowest cost as a second mode for each 4×4 sub-macroblocks;
        computing a cumulative of the lowest costs and comparing the cumulative cost with the cost associated with the first mode;
        choosing the mode with the lower cost among the cumulative cost and the cost associated with the first mode for performing intra prediction of the 16×16 macro-block, wherein, determining the second mode for each of the 4×4 sub-macroblocks of the 16×16 macro-block comprises the steps of:
  calculating a cost associated with DC prediction mode, H-prediction mode, and V-prediction mode;
  if a cost associated with the DC prediction mode is less than the cost associated with the H-prediction mode and the cost associated with the V-prediction mode, calculating a cost associated with each directional mode and associated diagonal directional modes for both H-prediction mode and the V-prediction modes and choosing the mode with minimum cost associated with it as the second mode;
  else, selecting the mode with a lower cost between H-prediction mode and V-prediction mode;
  calculating a cost associated with each directional mode associated with the selected mode;
  if the cost associated with the selected mode is less than the cost associated with the directional modes associated with the selected mode, selecting the selected mode as the second mode;
  else, calculating cost associated with each diagonal directional mode, and comparing the calculated cost with the cost associated with the directional modes; and
  selecting the mode with least cost, as the second mode.

\* \* \* \* \*